(No Model.)  5 Sheets—Sheet 1.

H. R. KUMLER.
BOX NAILING MACHINE.

No. 574,365. Patented Dec. 29, 1896.

Witnesses
Perry Stingman.
Alfred I. Townsend.

Inventor
Hervey R. Kumler
by Hazard & Townsend
his attys (No Model.) 5 Sheets—Sheet 2.
H. R. KUMLER.
BOX NAILING MACHINE.

No. 574,365. Patented Dec. 29, 1896.

Witnesses
Perry Kingman.
Alfred I. Townsend.

Inventor
Hervey R. Kumler
by Hazard & Townsend
his attys.

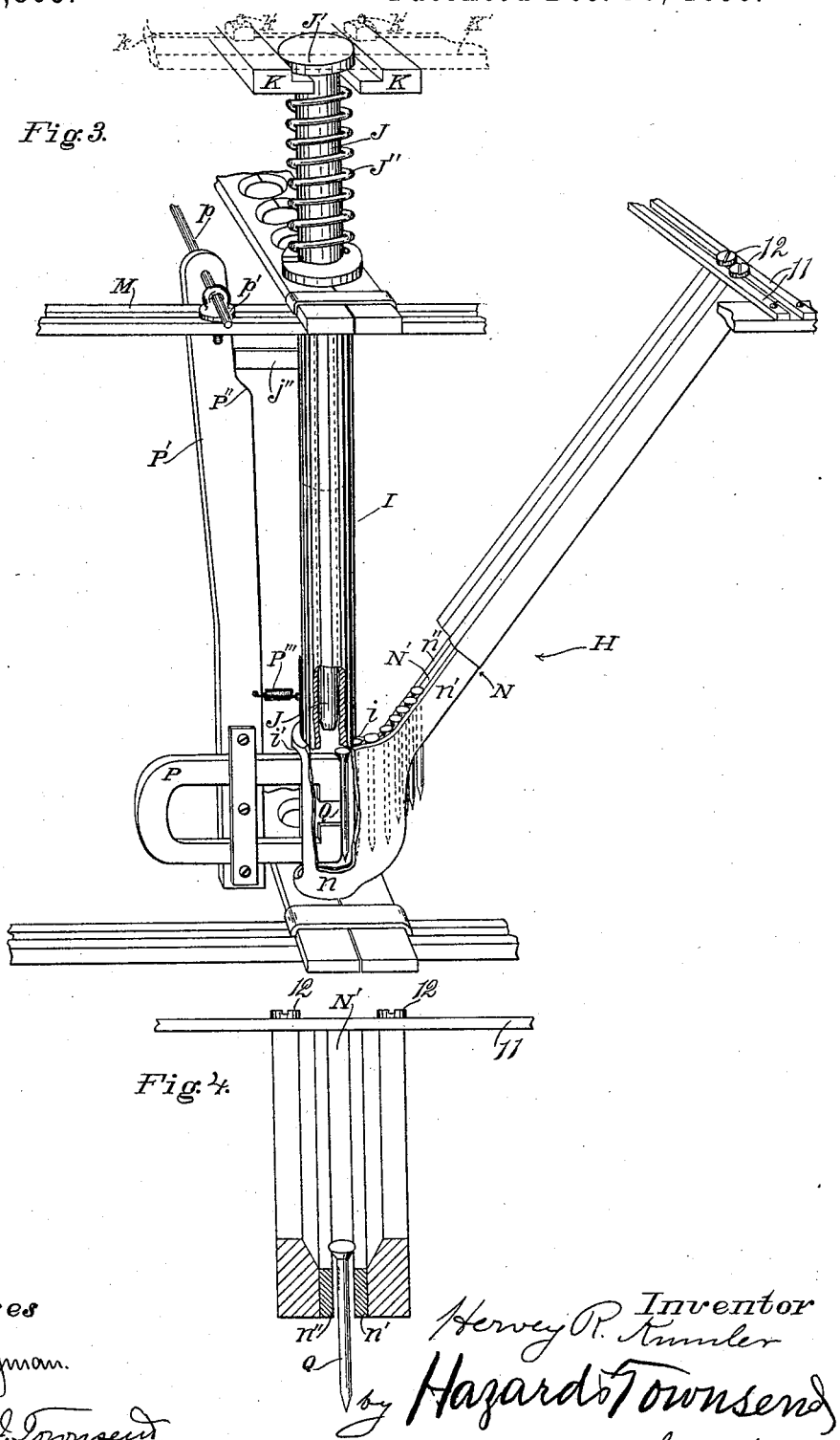

(No Model.) 5 Sheets—Sheet 4.

H. R. KUMLER.
BOX NAILING MACHINE.

No. 574,365. Patented Dec. 29, 1896.

Witnesses
Perry Kingman.
Alfred J. Townsend.

Inventor
Hervey R. Kumler
by Hazard & Townsend
his attys.

(No Model.)

5 Sheets—Sheet 5.

H. R. KUMLER.
BOX NAILING MACHINE.

No. 574,365.

Patented Dec. 29, 1896.

Witnesses.

Perry Kingman.

Alfred L Townsend.

Inventor
Hervey R. Kumler.
by Hazard & Townsend
his Attys.

UNITED STATES PATENT OFFICE.

HERVEY R. KUMLER, OF ETIWANDA, CALIFORNIA.

BOX-NAILING MACHINE.

SPECIFICATION forming part of Letters Patent No. 574,365, dated December 29, 1896.

Application filed March 2, 1896. Serial No. 581,475. (No model.)

*To all whom it may concern:*

Be it known that I, HERVEY R. KUMLER, a citizen of the United States, residing at Etiwanda, in the county of San Bernardino and State of California, have invented new and useful Improvements in Box-Nailing Machines, of which the following is a specification.

My invention relates to those machines designed to be operated by power to simultaneously drive all the nails required to nail one side of a box.

One object of my invention is to produce a box-nailing machine of this class which will be easy to manufacture, capable of adjustment to nail any ordinary-sized box, and adapted to be operated by manual labor or by other power, if desired.

Another object of my invention is to provide improved means for turning a box so that first one side and then another may be operated upon by mechanism adapted for such purposes.

A further object of my invention is to provide a machine of this class having the nail feeding and driving appliances arranged in independent sets capable of adjustment with each other, to thereby enable me to drive many or few nails in a box, as may be necessary.

My invention comprises, in addition to means for accomplishing the above objects, various features of construction and combinations of parts hereinafter fully set forth and claimed.

The accompanying drawings illustrate my invention.

Figure 1:
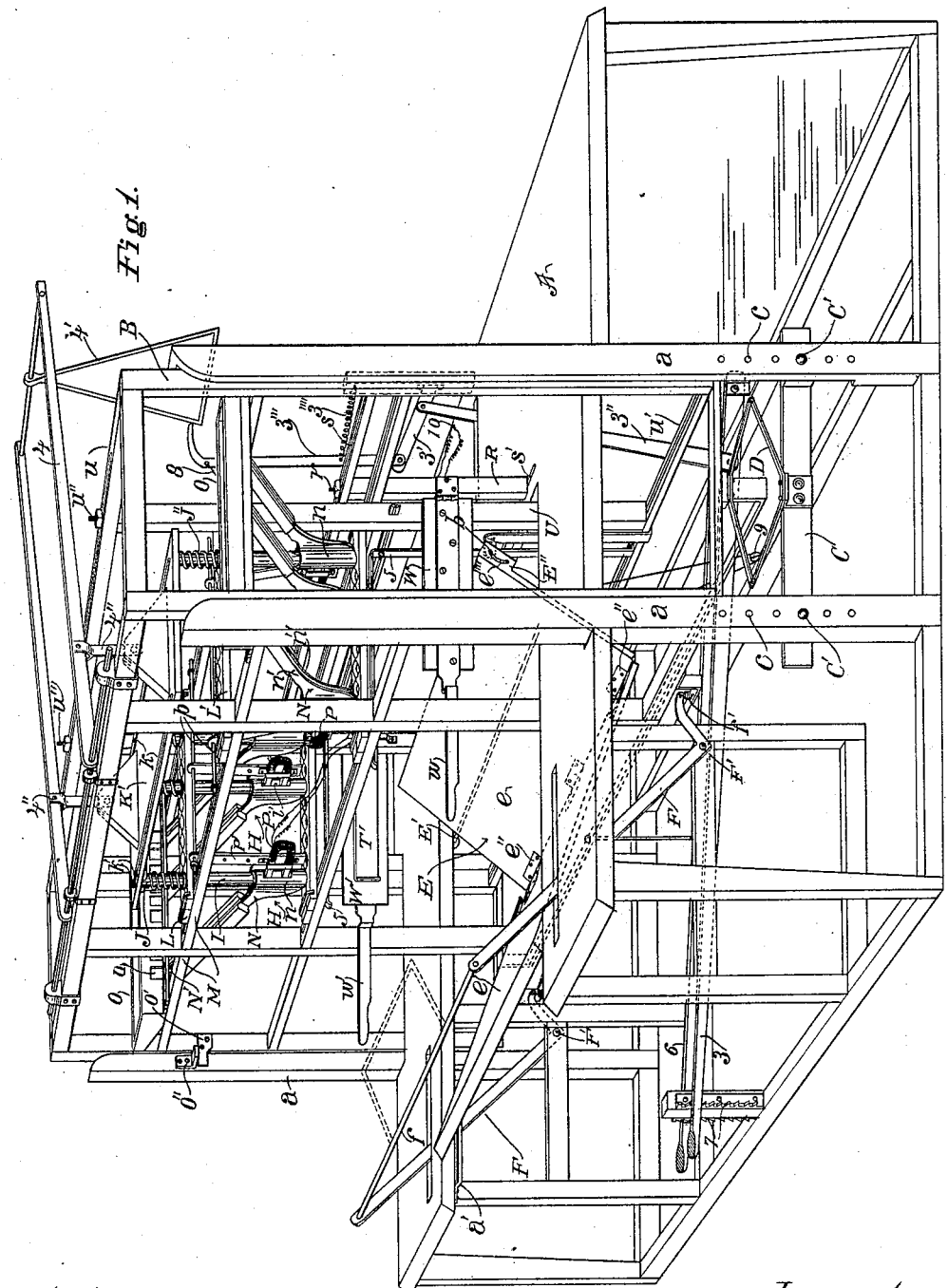
Figure 2:
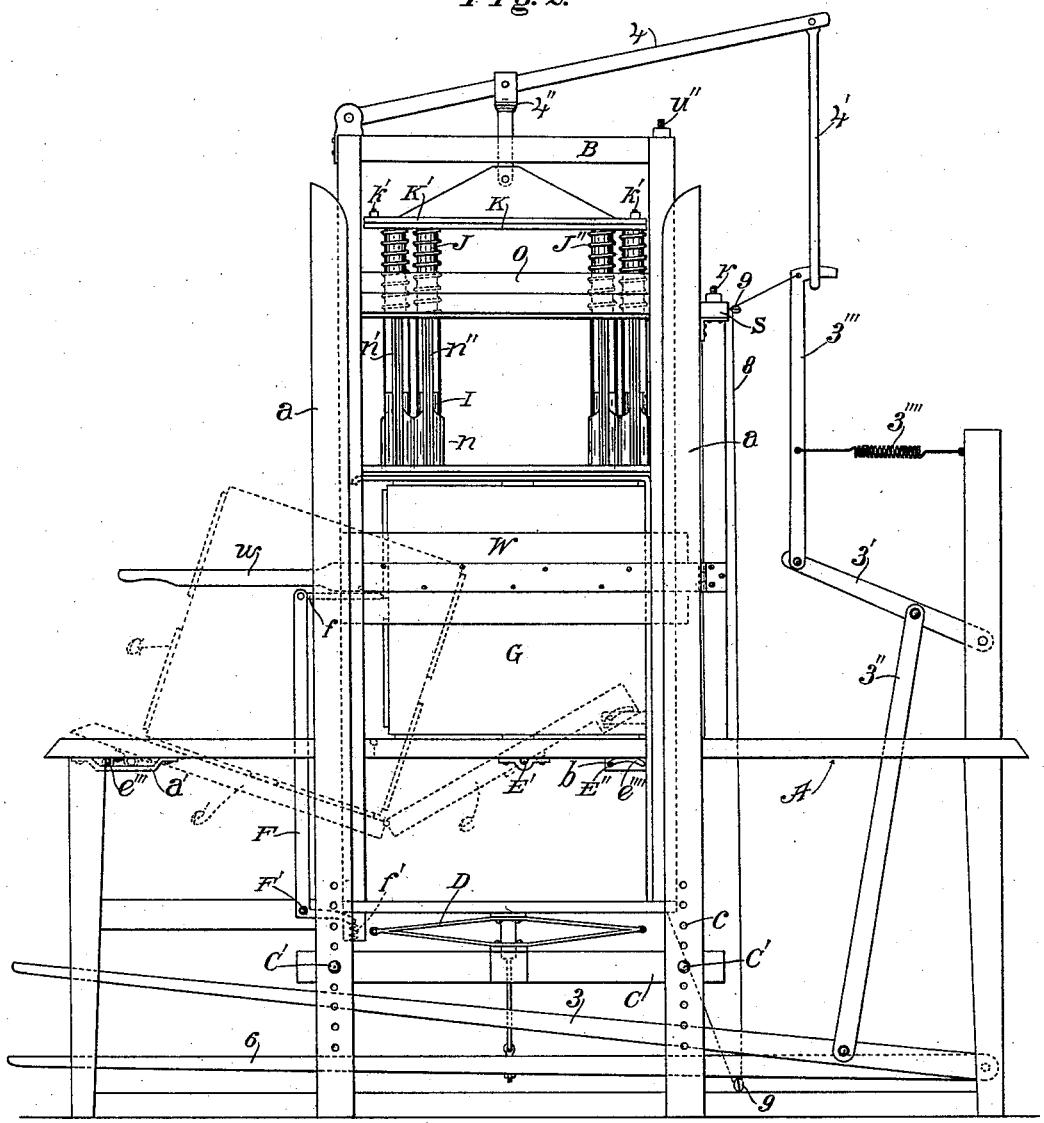
Figure 5:
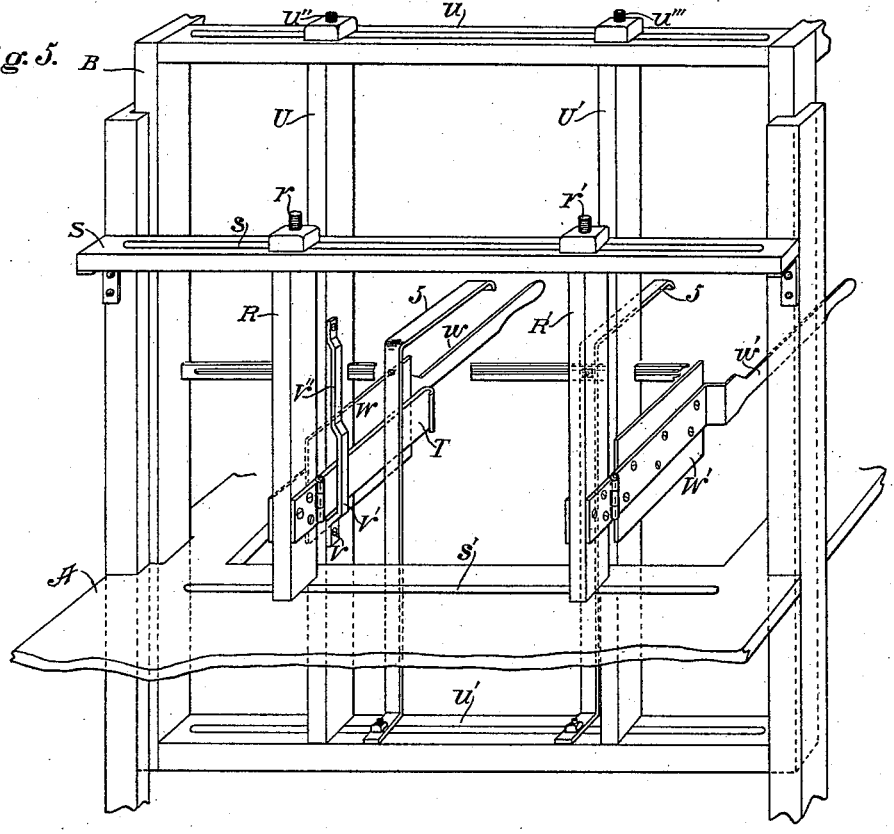
Figure 6:
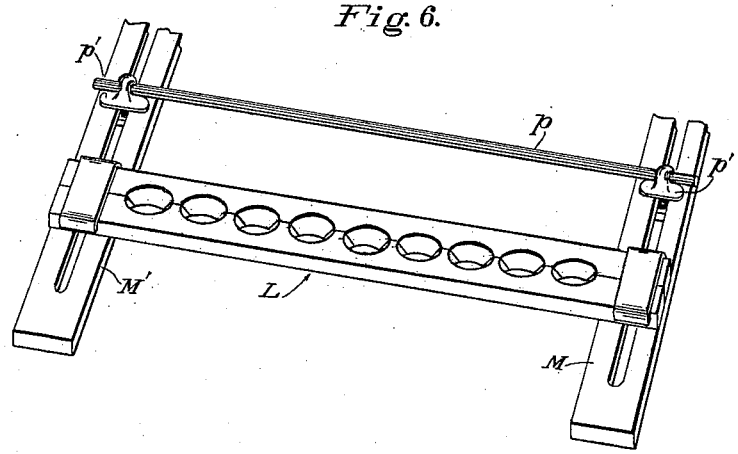
Figure 7:
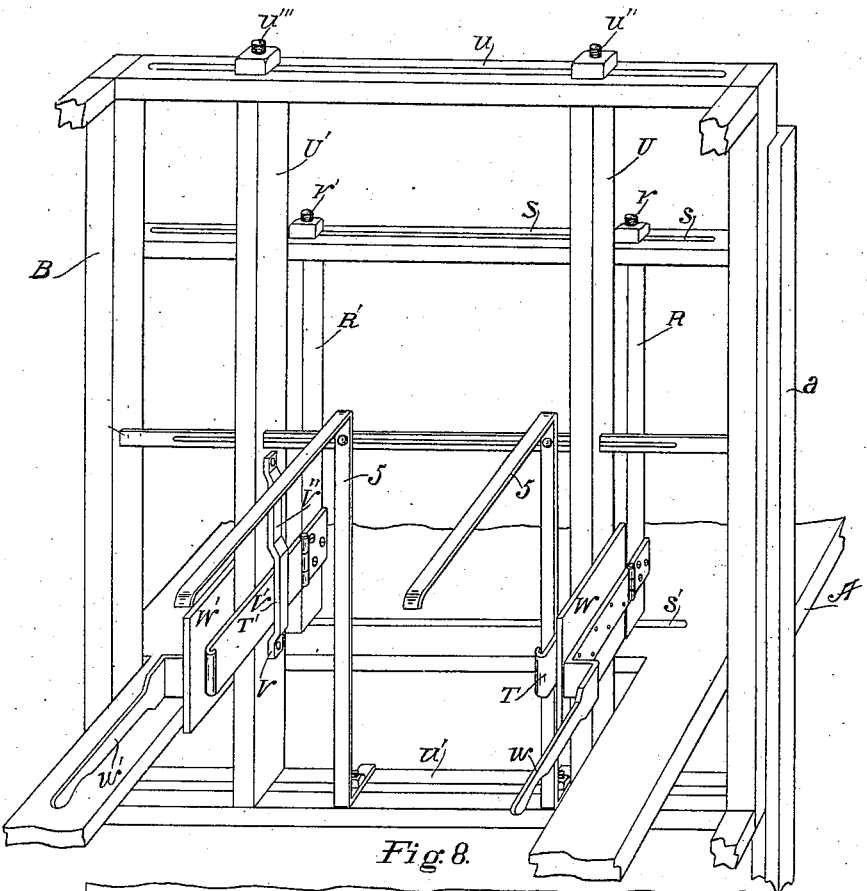
Figure 8:
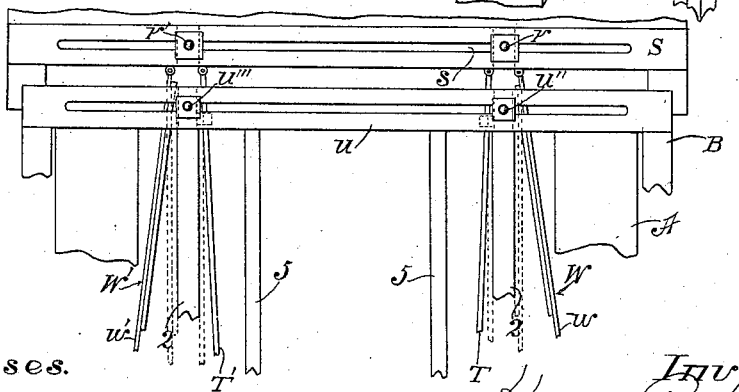

Figure 1 is a perspective side elevation of a machine embodying my invention. In this view only a few of the several sets of nail feeding and driving devices are shown, for the reason that a greater number thereof would obscure the view and cause confusion of lines. In this view the device is shown in the position which it assumes when the reciprocating frame is in its elevated position and the box-support is tilted to turn the box and bring another side thereof uppermost. Fig. 2 is a plain side elevation of the machine. Fig. 3 is a fragmental view illustrating one set of the nail feeding and driving appliances. Fig. 4 is a sectional view illustrating the construction of one of the nail-chutes. Fig. 5 is a fragmental elevation looking from the back of the machine and showing the box-end-holding clamps. Fig. 6 is a fragmental perspective view illustrating one of the nail-tube-holding devices whereby the tubes are rendered adjustable transverse the box. Fig. 7 is a front elevation of the device shown in Fig. 5. Fig 8 is a fragmental plan view of the same.

In the drawings, A represents a stationary support, which is provided with four uprights $a$, arranged to form vertical guideways in which a frame B is arranged to reciprocate. To these uprights are secured cross-bars C, which by means of bolts C' and a series of holes $c$, provided in the uprights $a$, are rendered vertically adjustable. Upon these cross-bars are secured springs D, and the reciprocating frame B is mounted upon these springs.

To the stationary support A is pivoted a tilting box-support E, which, as shown, is composed of two members $e$ and $e'$, hinged together by means of hinges $e''$, so that such members may tilt with relation to each other. The main member $e$ of the box-support is pivoted to the stationary support by means of a journal-rod E', arranged near the middle of such member, and the auxiliary member $e'$ is provided near its outer edge with lugs $e'''$, which are adapted to slide in horizontally-arranged guideways $a'$, provided in the stationary support.

At the rear of the pivotal point of the member $e$ of the box-support is secured a plate E''', having provided therein a slot or guideway $e''''$, which is formed in the arc of a circle. To the reciprocating frame B is secured a pin $b$, which is adapted to work in this slot and to operate to tilt the member $e$ of the box-support when the frame is elevated, as shown in Fig. 1, and to return such support to a horizontal position when the frame is depressed, as shown in Fig. 2. By reason of the two members $e\ e'$ being hinged together, when the member $e$ is tilted it tilts the member $e'$, the lugs $e'''$ sliding forward in the guideways $a'$, as shown.

To the stationary frame are pivoted angle-levers F by means of pivots F'. The upper ends of these levers are connected with each other by means of a cross-bar $f$, which forms a box-replacer and is adapted to engage the box G (shown in Fig. 2) and to push such box back into position beneath the reciprocating frame B when the frame is drawn downward, as shown in Fig. 2. The other ends of these levers are connected with the reciprocating frame by suitable yielding means, such as the springs $f'$, which are adapted to yield sufficiently to allow for any inequality in the size of the box material and to let the reciprocating frame be brought still lower and to seat firmly upon the box after the box has been fully placed in position beneath the frame by the replacer.

Carried by the reciprocating frame B are series of nail feeding and driving appliances, which, as shown, consist of independent sets of devices H, arranged to be adjusted with relation to each other to drive the nails close together or far apart to suit the requirements of the box being nailed. Each device consists of a nail-tube I, which is provided in its side wall with a slot $i$, through which the nails are introduced into the tube and in front of the nail-driving plunger J, which is arranged to reciprocate in the tube. The plunger J is provided with a flanged head $J'$ and secured, by means of adjustable attaching-bars K, to a plunger pressure-plate $K'$, which is of an area larger than the largest box designed to be made by the machine. This plate is provided upon two sides with slots $k$, parallel with each other, and the plungers can be adjusted longitudinal the plate by slipping the plunger-gripping bars along the plate and securing them at the desired point by tightening the bolts $k'$. The plungers may be adjusted transverse the plate by loosening the gripping-bars and sliding the plunger-heads of the plungers along between the members of the gripping-bar to the points desired and then tightening the bolts $k'$ to hold the plungers in their adjusted position. The nail-chutes I are also rendered adjustable in the same manner by means of the gripping-bars L L' and the slotted supports M and M'. In Figs. 3 and 6 these gripping-bars are clearly shown. Each pair of bars is arranged to form, when placed together as shown in Fig. 6, a series of countersunk or tapered openings within which the nail-tubes rest. A coiled spring $J''$ is arranged encircling each plunger and has one end arranged to bear against the support L and its other end arranged to bear against the plunger-gripping bars and to operate to normally hold the plunger retracted from the nail-tube.

I provide improved means for conveying nails to the nail-tube. As shown, this means consists of the nail-chutes N, which are each composed of a strip of sheet metal having its body $n$ bent around the nail-tube and arranged to form a substantially horizontal landing $n'$ to receive the nails and hold them in position opposite the slot $i$, and from the landing the members $n'$ $n''$ extend upward at an angle with the horizon and parallel with each other to form a nail-slot $N'$ therebetween. Secured to the frame B is a nail-feeding hopper O, which is provided with suitable openings $o$, through which the nails pass and fall into the slots $N'$ of the nail-chutes. As many openings $o$ may be provided as there are chutes when the machine is provided with its full complement of nail-driving appliances, and when the appliances are adjusted or so arranged as to not require the feeding of nails from a portion of said openings $o$ the openings not in use may be closed by any suitable means which will prevent the feeding of nails therethrough. This, however, will be readily understood by those versed in the art, and illustration thereof is neither necessary nor desirable herein. A bumper $O'$ is secured to the frame B and is adapted to engage with the bumper-plate $O''$, secured to the stationary frame A and to operate to jar the frame B and the hopper when the frame reaches its limit of upward movement and to thus cause nails to fall from the hopper O into the slots $N'$ of the nail-chutes.

I provide improved means for conveying the nails from the landing $N'$ of the chute into the nail-tube. These means consist of a magnet P, arranged to be operated to convey nails successively from the nail-chute into the nail-tube. These magnets play through slots $i'$ in the nail-tubes and are each suspended from an arm $P'$, which is pivoted at one end upon a rod $p$, which, by means of a thumb-nut $p'$, arranged to slide along in the slotted support M, is rendered adjustable toward and from the nail-tube. This arm extends downward at an angle with the tube, and a spring $P'''$ is arranged to normally hold the magnet in the tube, as shown in Fig. 3. A lug $j''$ is provided upon the plunger J and is arranged to engage with an inclined portion $P''$ of the arm $P'$ and, as the plunger is forced downward, withdraws the magnet from the slotted tube and brings the nail Q into the path of the plunger J, when the plunger engages with such nail and forces it down upon the box and drives it into the wood thereof. The magnet carries the nails under the plunger a distance such that the first nail is held exactly in the path of the plunger, the end of which is a little tapered, so as to strike this first nail only, the second nail being pushed aside by the plunger onto the shoulders of the slot $i$, where it is held back. These nail feeding and driving appliances are arranged in sets, each set being separate from the others, as shown, whereby they may be adjusted with relation to each other in order to adapt them for nailing orange or lemon boxes, raisin-boxes, or any other boxes which it is desired to nail; but my machine is more particularly adapted for nailing boxes having square ends.

In Fig. 5 I have illustrated my improved means for clamping and holding the box ends in position to form the box. It is necessary that these clamps operate to hold the ends firmly while the nails are being driven and that they release the box ends after the nails are driven, so as to allow the box to be turned and placed in position to receive the material for the other side of the box. It is also essential that these clamps be made adjustable transverse the machine in order to regulate the distance apart at which the box ends are held while the box is being nailed, thus to adapt the machine for making boxes of different lengths. As shown in the drawings, these means consist of the rear clamp-supports R R', which, by means of bolts $r\ r'$, are secured to transverse members S S', which are respectively provided with transverse slots $s\ s'$, which allow the uprights R R' to be adjusted transverse the machine and relative each other. The clamp for each box end consists of the inner clamping member T, (T',) which is pivoted or hinged by one end to the stationary member R (R') and arranged to swing horizontally. To the movable frame B are secured uprights U U', corresponding to the uprights R R' and made adjustable in similar manner by the slotted members $u\ u'$ and the bolts $u''\ u'''$. To each of the uprights U U' is secured strap-iron V, which is arranged to form a guideway $v$, which is widened at its lower end V' to allow the clamps to swing in toward each other when the reciprocating frame is in its elevated position, and is made inclined from a vertical at its upper end V''' to cause the clamps to swing out from each other and against the box end 2 when the reciprocating frame is drawn down to bring the box-nailing mechanism in position to drive the nails into the box. I arrange each of the inside members of the clamps in this manner, but the outer clamping members W W', which are hinged to the outer sides of the members R R', are provided with lever-handles $w\ w'$, which are arranged to be grasped by the operator and drawn inward toward each other, thus to bring the box end firmly against the inner clamps.

On account of the reciprocating frame B having to be elevated a considerable distance before the box-support can tilt sufficiently to turn the box and allow it to escape beneath the frame, it becomes necessary, when the frame B starts upon its upward movement, to disconnect the nail-driving appliances from the operating-lever; otherwise the sweep of the lever which operates the nail-driving appliances would be so great as to be objectionable. For this reason I arrange the nail-driving operating-lever to engage the nail-driving mechanism to operate such mechanism only when the frame B is in its lowest position ready for the nails to be driven home.

The means which I have shown for operating the nail-driving appliances consist of the foot-lever 3, pivoted by one end to the rear of the frame A, an intermediate lever 3', pivoted by one end to the frame A, a connecting-rod 3'', pivoted by one end to the lever 3 and at its other end to the lever 3', and a connecting-rod 3''', pivoted at one end to the intermediate lever 3' and provided at its other end with a hook arranged to enter an eye 4', which is provided on the rear end of the lever 4, which is pivoted by its front end to the frame B, and by means of plunger-links 4'', arranged intermediate the ends of the lever, is connected with the plunger base-plate K'. A spring 3'''' holds the hook in the eye. To the pitman 3''' is attached one end of a cord 8 or other suitable device, which passes over suitable pulleys 9 9' 9'' and has its other end secured to the reciprocating frame B and so arranged that when the frame starts upon its upward movement the cord pulls the pitman 3''' out of its engagement with the eye 4', so that the frame B and lever 4 are free to move upward without regard to the motion of the pitman 3'''.

5 5 are clamping devices arranged to clamp upon the top of the box to hold the box side pieces firmly in position upon the box ends while the nails are being driven.

6 indicates a lever which is pivoted at one end to the stationary frame A and is attached to the frame B substantially near its center, as shown in Fig. 1. The lever 6 and the lever 3 engage ratchet-racks 7 to retain them in their depressed position. The lever 6 operates to reciprocate the frame B in opposition to the springs D. The magnets P may be permanent magnets or may be magnetized by electricity conveyed from any suitable source (not shown) through wires 10. (Shown in Fig. 1.)

In practice the lever 6 is depressed sufficiently to carry the reciprocating frame B far enough down to bring the table or box-support E into a substantially horizontal position, as shown in Fig. 2. The box ends 2 are then placed in position between the clamps T T' W W', as shown in Fig. 8, and the side strips of the box are placed in position upon the ends in the usual manner. Then the lever 6 is operated to carry the frame B still lower, and this further movement operates the clamps T T' to force them outward, as shown in dotted lines in Fig. 8, and at the same time the operator grasps the levers $w\ w'$ and brings the clamps W W' in toward each other to clamp the box ends firmly between such clamps and the clamps T T'. This downward movement of the frame also brings the eye 4' of the lever 4 into position so that the hook of the pitman 3''' can enter the eye, and the lowering of the frame also relaxes the cord 8 and allows the hook to swing into the eye. The lever 6 is then brought into engagement with the ratchet-rack 7 to hold the frame B firmly upon the box, and then lever 3 is operated to carry the plunger base-plate K' downward, thus forcing the plungers J downward through the nail-tubes N and compressing the springs J''. As the plungers are forced down the lugs $j''$ engage with the inclined portion $P'''$ of the arm $P'$ and swing such arm outward, thus carrying the magnet P out of the path of the plunger J and bringing the nail Q into the nail-tube and into the path of the plunger. Further downward movement of the plunger carries the nail down against the box and forces it home into the wood. All the plungers are operated simultaneously, and all the nails in one side of the box are driven by one movement of the lever 3.

After the nails are driven the lever 3 is released, and the springs $J''$ force the plate $K'$ upward, and this, acting upon the lever 4, swings it into its elevated position. Then the lever 6 is released, and the springs D force the frame upward. As the frame starts upon its upward movement the cord 8 draws upon the pitman $3'''$ and pulls the hook out of engagement with the eye $4'$, thus permitting the frame B and the lever 4 to be carried upward into its fully-elevated position, as shown in Fig. 1. As the frame B is raised by the action of the springs D it operates to tilt the section $e$ of the box-support E, and the box slides down upon such support until it engages the section $e'$, when it tilts or falls over toward the operator, as shown in dotted lines in Fig. 2, thus bringing another side of the box uppermost. When the lever 6 is again depressed, it operates upon the box-replacer $f$, and such replacer is swung in toward the machine and engages the box, and as the frame is brought lower and the box-support E is thereby brought into a horizontal position the box-replacer slides the box into position beneath the frame B. The side members of the box are then placed in position upon the ends, and the operation just described is again repeated.

The slots $N'$ of the nail-chutes may be regulated to suit the size of nails to be fed. This is accomplished by means of bars 11, arranged parallel with each other, and screws 12, passing between the bars and screwed into the upper ends of the members $n$ $n'$, as shown in Figs. 3 and 4.

Now, having described my invention, what I claim as new, and desire to secure by Letters Patent, is—

1. In a box-nailing machine, the combination of the reciprocating frame carrying the nail feeding and driving appliances; the box-support comprising two members hinged together and pivoted to tilt and arranged to support the box beneath the reciprocating frame.

2. In a box-nailing machine, the combination of the reciprocating frame carrying the nail feeding and driving appliances; the tilting box-support arranged to support the box beneath the reciprocating frame; automatic means arranged to tilt the box-support to turn the box; and automatic means for replacing the box beneath the reciprocating frame.

3. In a box-nailing machine, the combination set forth of the box-support; the reciprocating frame carrying the nail feeding and driving appliances; means for reciprocating the frame; and independent means arranged to engage the nail-driving appliances and to operate such appliances only after the reciprocating frame has reached its lowest position.

4. In a box-nailing machine, the combination of the tilting box-support; the reciprocating frame connected with such box-support and arranged to tilt it when the frame is in its elevated position; nail feeding and driving appliances carried by the reciprocating frame; means for reciprocating the frame; and independent means for operating the nail-driving appliances after the frame has reached its lowest position.

5. In a box-nailing machine, the combination set forth of the tilting box-support; the reciprocating frame connected with the box-support and arranged to tilt such support when the frame is upon its upward movement; nail feeding and driving appliances secured to the reciprocating frame and each comprising a slotted nail-tube, a magnet arranged to feed nails into such tube, and a plunger arranged to reciprocate in such tube; means for reciprocating the frame; and independent means for reciprocating the plungers and the magnets.

6. A box-nailing machine comprising the box-support; the reciprocating frame provided with the nail feeding and driving appliances and having the plunger-operating lever pivoted thereto and arranged to operate the nail-driving plungers; means for reciprocating the frame; and suitable independent means arranged to engage the plunger-operating lever to operate such lever only after the frame has reached its lowest position.

7. In a box-nailing machine the combination set forth of the box-support; the reciprocating frame carrying the nail feeding and driving appliances; the nail-driving lever pivoted at one end to the reciprocating frame and provided at its other end with the eye; the pitman provided with a hook arranged to enter the eye when the frame is in its lowest position; the spring arranged to hold the hook normally in engagement with the eye; suitable means for operating the pitman-arm; and suitable means arranged connecting the arm with the reciprocating frame to withdraw the hook from its engagement with the eye when such frame starts upon its upward movement.

8. In combination, the slotted nail-tube; the plunger arranged to reciprocate in the nail-tube; the magnet suspended by an arm and arranged to reciprocate through the slotted nail-tube, and the magnet-operating lug secured to the plunger and adapted to engage the arm of the magnet to retract the magnet when the plunger is forced into the nail-tube, and the nail-chute arranged to feed nails to the magnet.

9. In a box-nailing machine, the combination of the box-support; the reciprocating frame carrying the nail feeding and driving mechanism; the lever for operating the nail-driving mechanism, pivoted by one end to the reciprocating frame, operatively connected with the nail-driving mechanism, and provided at its other end with the eye; the power-lever pivoted by one end to the frame; the intermediate lever pivoted by one end to the frame; the connecting-rod connecting the operating-lever with the intermediate lever; the pitman-rod pivoted at one end to the intermediate lever and having its other end provided with a hook arranged to enter the eye of the nail-driving operating-lever when the reciprocating frame is in its lowest position; the spring arranged to normally hold the pitman in position in the eye; and the cord having one end secured to the pitman and at its other end secured to the reciprocating frame and arranged to draw the hook out of engagement with the eye when the reciprocating frame starts upon its upward movement.

10. In a box-nailing machine, the combination of the box-support; the reciprocating frame carrying the nail feeding and driving mechanism; the lever for operating the nail-driving mechanism, pivoted by one end to the reciprocating frame, operatively connected with the nail-driving mechanism, and provided at its other end with the eye; the power-lever pivoted by one end to the frame; the intermediate lever pivoted by one end to the frame; the connecting-rod connecting the operating-lever with the intermediate lever; the pitman-rod pivoted at one end to the intermediate lever and having its other end provided with a hook arranged to enter the eye of the nail-driving operating-lever when the reciprocating frame is in its lowest position; the spring arranged to normally hold the pitman in position in the eye; and means connecting the pitman with the reciprocating frame and arranged to draw the hook out of engagement with the eye when the reciprocating frame starts upon its upward movement.

11. In a box-nailing machine, the combination set forth of the tilting box-support; the reciprocating frame arranged above the box-support; intermediate means connecting the reciprocating frame with the box-support and arranged to tilt such support when the frame is in its elevated position; the box-replacer having one end operatively connected with the reciprocating frame and having its other end arranged to operate to replace the box in position beneath the reciprocating frame during the downward movement of such frame.

12. In a box-nailing machine, the combination set forth of the stationary frame provided with the guideways; the box-support consisting of two members pivoted together, one of such members being pivoted to the stationary frame, and the other of such members being provided with studs arranged to slide in the guideways provided in the stationary frame; the reciprocating frame carrying the nail feeding and driving mechanism; means for reciprocating the frame; and means operatively connecting the frame with the box-support to tilt such support when the frame is upon its upward movement.

13. In a box-nailing machine, the combination set forth of the stationary frame; the box-support secured to such stationary frame; the reciprocating frame arranged to move vertically in the stationary frame; the springs arranged to normally hold the reciprocating frame elevated; nail-driving mechanism carried by the reciprocating frame; the nail-chutes arranged to supply nails to the nail-driving mechanism; the nail-holding trough or hopper secured to the movable frame and adapted to supply nails to the nail-chutes; and the bumper secured to the reciprocating frame and adapted to engage the stationary frame to jar the nail-holding trough to feed nails into the nail-chutes.

14. A box-nailing machine comprising a box-support; a reciprocating frame carrying nail feeding and driving mechanism; suitable means for reciprocating the frame; and independent means arranged to operate the nail-driving mechanism.

15. In a box-nailing machine, the combination set forth of the stationary frame; the cross-bars adjustably secured to the stationary frame; the springs secured to the cross-bars; the reciprocating frame mounted upon the springs and carrying the nail feeding and driving appliances; suitable means for reciprocating the frame in opposition to the springs; and suitable means for operating the nail-driving mechanism.

16. In a box-nailing machine, the combination set forth of the tilting box-support; the reciprocating frame; the box-replacer; and suitable means connecting the box-support and the box-replacer with the reciprocating frame and arranged to tilt the support when the frame is raised, and to retract the box-replacer when the frame is tilted.

17. In a box-nailing machine having adjustable nail-tubes, the combination of the plunger-head plate arranged above such nail-tubes and provided along its length with the slots; the plunger-engaging members each consisting of two bars arranged to chamber between them the heads of the plungers and secured to the plunger-head plate by means of bolts passing through the slots in the plate; and the plungers having their ends provided with heads arranged to be engaged by the plunger-engaging bars, and having their lower ends arranged to reciprocate in the nail-tubes.

18. In a box-machine, the combination set forth of the stationary frame; the tilting box-support; the reciprocating frame; the box-replacer; suitable means connecting the reciprocating frame with the box-support to tilt such support when the frame is elevated; and
5 suitable yielding means connecting the box-replacer with the reciprocating frame to operate the replacer to replace the box when the tilting support is returned to its horizontal position.

HERVEY R. KUMLER.

Witnesses:
 ETHEL W. GURLEY,
 H. B. GURLEY.